P. GAUTHIER.
SPRING TIRE.
APPLICATION FILED NOV. 11, 1914.

1,159,759.

Patented Nov. 9, 1915.
2 SHEETS—SHEET 1.

WITNESSES:

INVENTOR.

BY

ATTORNEY.

P. GAUTHIER.
SPRING TIRE.
APPLICATION FILED NOV. 11, 1914.

1,159,759.

Patented Nov. 9, 1915.
2 SHEETS—SHEET 2.

WITNESSES:
Ludger A. Nicol.
Vira J. Durrnall.

INVENTOR.
Phibia Gauthier
BY Gardner W. Parson
ATTORNEY.

UNITED STATES PATENT OFFICE.

PHIBIA GAUTHIER, OF LOWELL, MASSACHUSETTS.

SPRING-TIRE.

1,159,759.   Specification of Letters Patent.   Patented Nov. 9, 1915.

Application filed November 11, 1914. Serial No. 871,591.

*To all whom it may concern:*

Be it known that I, PHIBIA GAUTHIER, a citizen of the United States, residing at Lowell, in the county of Middlesex and State of Massachusetts, have invented certain new and useful Improvements in Spring-Tires, of which the following is a specification.

This invention relates to wheels such as are used upon automobiles, trucks, wagons, etc. Its purpose is to provide a wheel with an elastic outer rim or tire, the elasticity of which is caused by springs instead of by compressed air.

My purpose is also to provide a tire which has a relatively large bearing surface on the ground and one which will not readily slip thereon. The spring mechanism is so covered that it will not rust nor become clogged with dirt. My arrangement of springs is such that one part of a series of springs will take up the ordinary lighter shocks or loads while the other part will be brought into action when heavy shocks or heavy loads are encountered. I claim that a wheel with an outer rim of my construction will ride more easily than one with a pneumatic tire and cannot be punctured.

Figure 1:
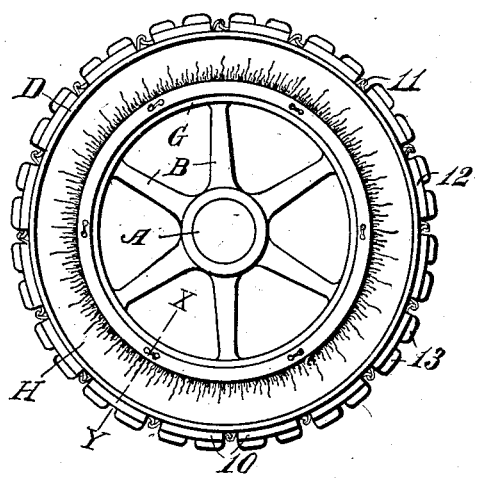
Figure 2:
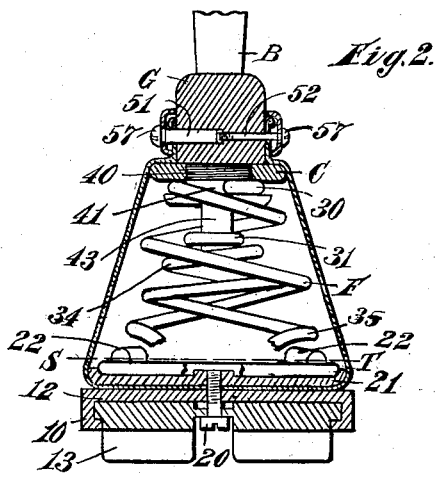
Figure 3:
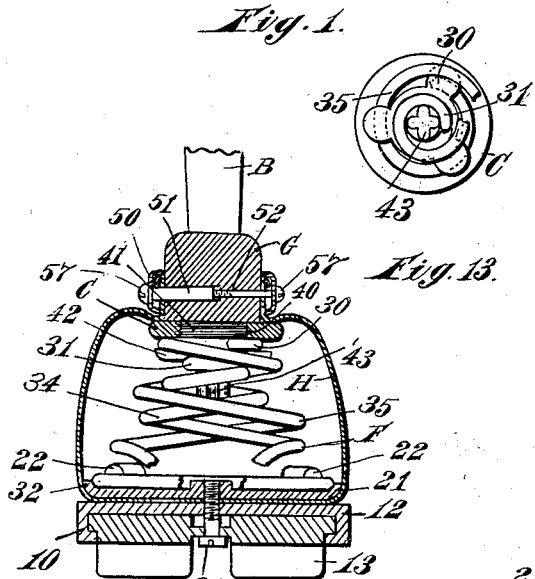
Figure 4:
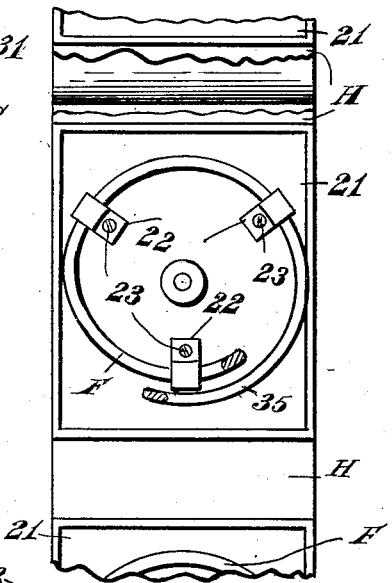
Figure 5:
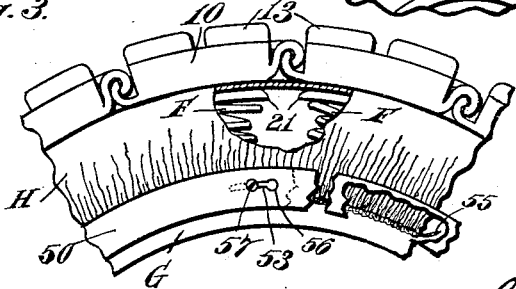
Figure 6:
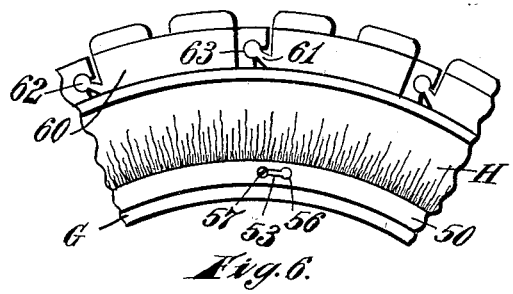
Figure 7:
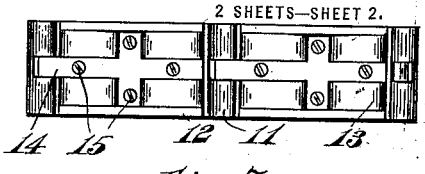
Figure 8:
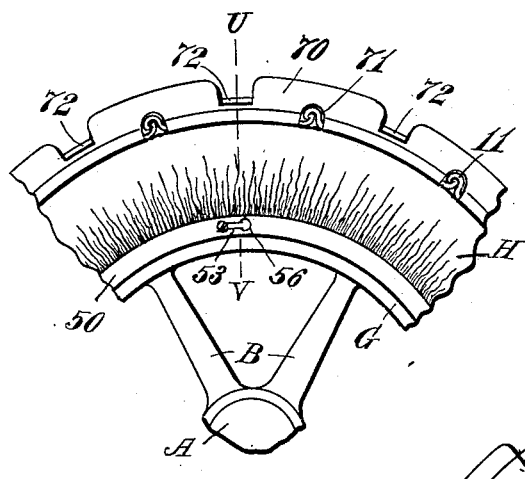
Figure 12:
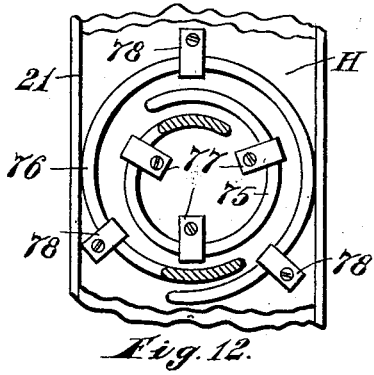

Figure 1 is a side elevation of a wheel with a tire of my construction. Fig. 2 is an enlarged section as on line X—Y of Fig. 1 with some parts in full lines and with the inner and outer coils of the spring in their normal positions. Fig. 3 is a view similar to Fig. 2 with both coils compressed. Fig. 4 is a view of the spring holding plate as if looking down on the line S—T of Fig. 2. Fig. 5 is an enlarged side elevation of part of a tire with portions broken away to show the construction. Fig. 6 is a view similar to Fig. 5 of a tire with a slightly different hinge joint between sections. Fig. 7 is a plan view of Fig. 5. Fig. 8 is an elevation and Fig. 9 a plan view of part of a wheel with a tire having a different type of bearing member. Fig. 10 is a partial section on line U—V of Fig. 8. Fig. 11 is a side elevation of a detachable inner rim. Fig. 12 is a view similar to Fig. 4 of a modified form of spring. Fig. 13 is a detail of the spring holding bolt flange.

A is the hub, B, B represent the spokes, G is the wooden rim and C is a rigid metal tire of any usual construction. This tire C, I will call the inner rim.

I prefer to use an outside hinged sectional elastic rim, tire or chain concentric with the inner rim similar to that shown in patent to Phibia Gauthier on armor chains, Dec. 2, 1913, No. 1,080,054. In such construction, the sections 10 of this outer rim D are hinged together at 11 by any suitable form of hinge. Parts of each hinge are preferably integral with the face plate 12 of each section. Each section may have a durable separate bearing member, as 13, of rubber, leather, rawhide or other suitable material each permanently fixed to the plate 12 or preferably detachably attached by a suitable attaching member 14 and screws 15.

To the inside of each hinged outer rim section 10 is fastened by means of a screw 20 the dished spring holding plate 21. To this is held by means preferably of three clamps 22, 22, 22, and suitable screws 23, the base of a peculiarly formed compression spring F. Each compression spring F is of double helical-volute form and is preferably made of one piece of spring metal wound so as to form exterior end loop 30 at the top and thence extending outward and downward in a helical-volute form as exterior coil 35 until it reaches the desired distance and size to fit at its base into dished spring holding plate 21, after which it is wound inward and upward as an interior coil 34, of a helical-volute form and terminating in interior end loop 31 in axial alinement with exterior end loop 30. Inner coil 34 is shorter or of less height than outer coil 35. Exterior loop 30 is bent as far as possible to a plane at a right angle to the axis of the coil and the apex end of interior loop 31 is also bent to a similar right angle plane. The axes of these compression springs are radially disposed with reference to the center of the wheel.

The base portion 32 is held by the clamps 22 and is preferably slightly curved to conform to the curvature of plate 21. Opposite the center of dished spring holding plate 21, I screw into a radial threaded opening 40 in the outside of inner rim C, a spring holding bolt 41 which is of such size as to pass through exterior loop 30 and which has a holding flange 42 which extends over said loop 30. It has also a central head 43 which normally just enters interior loop 31 as shown in Fig. 2, but which will be forced inwardly when a heavy load is carried until holding flange 42 engages interior loop 31. Head 43 may be made many sided or of cross form so that it may be seized by a suitable wrench whereby spring bolt 41 may be screwed in or out. Loop 31 is slidable on head 43. The purpose of this construction is so that with ordinary loads interior coil 34 is out of action as shown in Fig. 2 and the work is being done by exterior coil 35, but when an extra heavy load is being carried, exterior coil 35 is forced inward until the holding flange 42 rests against interior loop 31 as shown in Fig. 3, whereby both springs are in effective operation to carry the load.

To prevent the resting of the springs and to prevent dust and dirt getting thereinto, I prefer to use a one piece canvas cover H which preferably consists of a strip of canvas held at its middle portion between the face plates 12 and the attached corresponding dished spring holding plates 21. This canvas cover H extends upward on each side of the inner rim C and onto the sides of wooden rim G where it is held in place by means of rings 50, 50 which are fastened to the wooden rim G preferably by means of specially shaped bolts 51, 52 which pass through key hole slots 53 in rings 50 and holes 54 in canvas H. These canvas holding rings 50 are both channeled on their faces which adjoin the wood rim whereby the draw strings 55 and the bunching and puckering of the longitudinal edges of the canvas cover may be inclosed therein. The ends of the draw strings are tucked up underneath so as to be out of the way. The canvas cover will naturally wrinkle between the outer rim and the inner rim but such wrinkling is unobjectionable.

I prefer to use specially made bolts for holding the canvas holding rings 50 against the wooden rim G each of which comprises outside section 51 which screws over inside section 52 both sections having suitable heads 57. These heads 57 are of such size that they will readily pass through the eye 56 but not through the slotted portion of slots 53. They will also readily pass through holes 54 in the canvas cover. As the head 57 of each bolt section 51 or 52 has a slot, whichever head is most convenient to reach can be turned with a screw driver thereby screwing the sections together or screwing them apart as desired. When all the bolts have been loosened sufficiently, the holding ring 50 being released from the binding action of the heads thereof can be slightly revolved until the eye of each slot 53 is opposite a bolt head as shown by the dotted lines in Fig. 5. In this position, the ring 50 can be readily removed and the canvas can be pulled over the heads of the bolts, the draw strings can be loosened up and the cover so opened out as to expose the springs inside.

I prefer to make the bolt spring holding flange 42 somewhat in the shape of a clover leaf with three points of contact with the flat surface of exterior loop 30, and with three points of contact, when engaged therewith, with the flat interior loop 31. By making these loops flat and axially at right angles and by using a three point contact, the danger of the spring being pushed out of place is greatly reduced. This danger and the likelihood of displacement in any manner by side thrust is much reduced by the use of the helical-volute form of the compression springs F which being held firmly at the base and either being held firmly at the top or guided axially, in the case of the inner coil, tends to brace the outer rim with reference to the inner rim. This construction also permits the use of a wide sectional outer rim. I prefer to dip my springs in some suitable composition which will not rust.

I do not confine myself to the exact type of flexible outer rim shown, nor to the type of flexible joint between the sections. For instance, as shown by Fig. 6, I may use sections 60 each of which at one end has a transverse web 61 with a bead 62 at the end which enters a corresponding groove 63 in the adjoining section 60. Such a construction makes a satisfactory form of hinge joint.

In place of a rubber or rawhide bearing member, or tread such as 13, I may use one of steel or other metal if desired.

Figure 9:
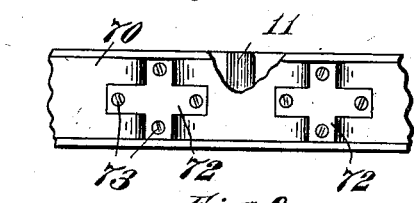
Figure 10:
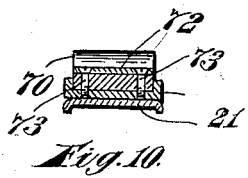
Figure 11:
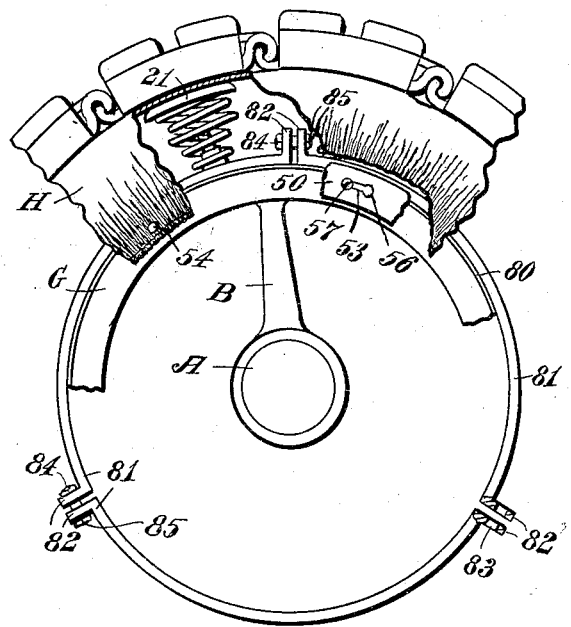

In place of a series of bearing members each fixed to or detachable from an outer rim section, I may use an annular or continuous outer tire such as 70 as shown in Figs. 8, 9 and 10. This is preferably so formed as to leave depressions 71 for the reception of the hinge members 11 and is preferably attached to the outer rim sections by means of metal attaching members 72 and screws 73. With this construction, if part of the tire is torn, it can be cut away and removed and a similar section attached in its place. Such tire should have sufficient thickness over the hinge members 11 so that they will not readily wear through it.

As shown in Fig. 12 instead of a double helical-volute spring made of a single piece of wire, I may use two such springs 75 and 76 each fastened by suitable clamps 77 and 78 to a dished spring holding plate 21. One advantage of this construction is that if one coil breaks, it can be replaced without disturbing the others.

The size of the wire of which the exterior and interior coils of my compression springs are made may be varied to suit the load and may be of different sizes if two springs are used.

Whether I use a double helical-volute spring or two single helical-volute springs, the center of the loops at the tops of the respective coils or springs and the center of the bases of such coils or springs should be on the axis of the spring or of both springs and this axis should coincide with a radial line from the center of the wheel. In other words, my double helical-volute springs or both single helical-volute springs should be radially disposed with reference to the center of the wheel. As both coils or both springs curve outward from their respective tops, their respective bases or the common base in the case of the double helical-volute spring will be larger in size than the bearing loops at their tops.

I prefer to use draw strings 55 as a convenience in closing up the canvas cover H but these may be dispensed with.

The inner rim of my construction when in place should be rigid and the outer rim should be flexible and preferably built up of sections which are detachable.

A great advantage of a series of helical-volute springs radially disposed between the inner and the outer rim is that when they are compressed, the parts do not rub against each other as the spring is larger at the base than at the top.

Each coil is preferably made as shown in Figs. 2, 3, 11, 12 and 13 concentric so that when compressed flat, the turns of the wire will be one inside the other. With this construction, the greatest amount of compression is obtainable and there is no wear from rubbing. To better brace the device, the pitch of the outer coil should be opposite that of the inner coil.

As with light loads, the interior series of springs are not brought into action, it is evident that a single series of helical-volute springs could be used if desired, or several series one inside the others as shown in Fig. 12.

Referring to Fig. 11, it may be desirable in some cases where a wheel has the usual hub A, spokes B, wooden rim G and a flat metal tire 80 permanently fixed thereto, to use a detachable inner rim as shown. This may consist of a plurality of curved sections such as 81, 81, 81 all struck on such a curve as to substantially fit outside of tire 80 and each having at each end an ear 82 with a suitable hole 83 therein to receive a bolt 84 which also carries a nut 85. These sections 81, 81, 81 are each equipped with a suitable number of spring holding bolts and in other respects are similar to the solid inner rim C hereinbefore described. It is desirable that the length of the ears 82 should be slightly less than that of the spring holding bolts 41. It is also desirable that the canvas holding rings 50 should be wide enough and so placed that they will slightly lap over the sections 70 81 thereby assisting to prevent them from slipping off sidewise.

I claim:

1. In a wheel, the combination of an inner rim, a flexible outer rim, and a plurality of spring holding bolts each having a holding flange and a central head, with a plurality of compression springs, each formed with an exterior coil having a loop at its top held between the bolt flange and the inner rim and an interior coil of less height having at its top a loop in slidable relation with a central head both coils being of helical-volute form with the common base of both in engagement with the outer rim.

2. In a wheel, the combination of a rigid metallic inner rim, an outer rim concentric therewith formed of rigid metallic sections hinged together, and a plurality of spring holding bolts each screwed to the inner rim and each having a holding flange and a central head, with a plurality of compression springs, each formed of one piece of wire with an exterior coil having a loop at its top held between the bolt flange and the inner rim and an interior coil of less height having at its top a loop in slidable relation with a central head both coils being of helical volute form, and a plurality of metal clamps and screws whereby the common base is rigidly held in engagement with an outer rim section.

3. In a wheel, the combination of a rigid inner rim, a flexible outer rim, and a plurality of spring holding bolts radially fixed to the outside of the inner rim each having a central head and a spring holding flange with three points of contact on its inside and its outside, with a plurality of compression springs each formed with an exterior coil having a loop at right angles to a radius of the wheel held between the bolt flange and the inner rim and an interior coil of less height having at its top a loop at right angles to a radius of the wheel in slidable relation with the central head, both coils being of helical-volute form with the common base of both fixed to the outer rim as described.

4. In a wheel, the combination of an inner rim, with a flexible outer rim, a plurality of spring holding bolts radially disposed on the outside of the inner rim each having a central head, and two series of helical-volute compression springs each series being of different heights and each spring being radially disposed between the inner and the outer rim, the tops of the higher series of springs being fixed to the inner rim, the bases of both series being fixed to the outer rim, and the tops of the springs of the other series each being made with a loop in slidable engagement with the central head of a spring holding bolt.

5. In a wheel, the combination of a rigid inner rim, a flexible outer rim comprising a plurality of sections hinged together, dished spring holding plates fastened to the inner side of said sections, and a plurality of spring holding bolts radially fastened to the inner rim each having a holding flange and a central head, with a plurality of compression springs each formed with an exterior coil having a loop at its top held between the bolt flange and the inner rim and an interior coil of less height having at its top a loop in slidable relation with the central head, both coils being of helical-volute form with the common base of each resting in a dished spring holding plate, and clamps which fasten such base to said plate.

6. In a wheel, the combination of a rigid inner rim, a flexible outer rim comprising a plurality of sections hinged together, dished spring holding plates fastened on the inner side of said sections, and a plurality of spring holding bolts radially fastened to the inner rim each having a holding flange and a central head, with a plurality of compression springs each formed with an exterior coil having a loop at its top held between the bolt flange and the inner rim and an interior coil of less height having at its top a loop in slidable relation with the central head, both coils being of helical-volute form with the common base of each resting in a dished spring holding plate, and clamps which fasten such base to said plate, together with a canvas cover which extends on both sides between the inner rim and the outer rim and between the hinged sections and the dished spring holding plates as described.

7. In a wheel, the combination of a wooden rim, a rigid metal inner rim which surrounds the wooden rim, a flexible outer rim comprising a plurality of sections hinged together continuously, dished spring holding plates fixed on the inner side of said sections, and a plurality of spring holding bolts each having a holding flange and a central head, with a plurality of compression springs each formed with an exterior coil having a loop at its top held between the bolt flange and the inner rim and an interior coil of less height having at its top a loop in slidable relation with the central head both coils being of helical-volute form with the common base of each resting in the dished spring holding plate, and clamps which fasten such base to said plate, together with a canvas cover which extends on both sides between the wooden rim and the outer rim, channeled canvas cover holding rings adapted to hold the canvas cover to the wooden rim, and means for fastening said rings to the wooden rim as described.

In testimony whereof I, hereto affix my signature in presence of two witnesses.

PHIBIA GAUTHIER.

Witnesses:
 FISHER H. PEARSON,
 GARDNER W. PEARSON.

Copies of this patent may be obtained for five cents each, by addressing the "Commissioner of Patents. Washington, D. C."